(12) United States Patent
Taillon

(10) Patent No.: US 7,111,542 B2
(45) Date of Patent: Sep. 26, 2006

(54) CIRCULAR SAW BLADE ASSEMBLY FOR A TREE FELLING HEAD

(75) Inventor: Michel Taillon, St-Prime (CA)

(73) Assignee: Les Produits Gilbert Inc., Quebec (CA)

( * ) Notice: Subject to any disclaimer, the term of this patent is extended or adjusted under 35 U.S.C. 154(b) by 0 days.

(21) Appl. No.: 10/429,087

(22) Filed: May 2, 2003

(65) Prior Publication Data

US 2004/0216580 A1 Nov. 4, 2004

(51) Int. Cl.
*B27B 33/12* (2006.01)

(52) U.S. Cl. .......................................... 83/844; 83/840

(58) Field of Classification Search .................. 83/835, 83/836, 839, 840, 844, 854, 855; 144/241, 144/34.1, 230; 409/234; 407/30, 33, 34, 407/42, 46, 116, 102–104, 113, 114
See application file for complete search history.

(56) References Cited

U.S. PATENT DOCUMENTS

| | | | | |
|---|---|---|---|---|
| 2,746,494 A | * | 5/1956 | Cox | 83/831 |
| 4,222,298 A | * | 9/1980 | James | 83/853 |
| 4,628,976 A | * | 12/1986 | Loring | 144/241 |
| 4,744,278 A | * | 5/1988 | Wright | 83/839 |
| 5,261,306 A | * | 11/1993 | Morey et al. | 83/840 |
| 5,363,891 A | * | 11/1994 | Plante | 144/218 |
| 5,377,731 A | | 1/1995 | Wildey | |
| 5,481,952 A | * | 1/1996 | MacLennan | 83/839 |
| 6,464,157 B1 | * | 10/2002 | Balvanz et al. | 241/191 |
| 6,488,456 B1 | * | 12/2002 | Satran et al. | 409/234 |
| 6,497,537 B1 | * | 12/2002 | Francis et al. | 407/37 |
| 6,536,322 B1 | * | 3/2003 | Butler et al. | 83/844 |
| 2002/0002892 A1 | * | 1/2002 | DiSabatino | 83/835 |

* cited by examiner

*Primary Examiner*—Kenneth E. Peterson
*Assistant Examiner*—Phong Nguyen
(74) *Attorney, Agent, or Firm*—Myers Bigel Sibley & Sajovec

(57) ABSTRACT

A circular saw blade assembly of a tree felling head of a type which has peripherally mounted cutting teeth. The assembly has a circular disc plate with a rim. Mounting lug arrangements evenly distributed and outwardly projecting around the rim receive tooth holders having respective heads adapted to receive the cutting teeth, and respective shanks projecting behind the heads and adapted to receive bolts for fastening the cutting teeth against the heads of the tooth holders. Each mounting lug arrangement has opposite lug elements spaced from each other and extending in parallel with a radial plane of the disc plate. The lug elements of each mounting lug arrangement define an outwardly opened channel extending substantially in a tangential direction with respect to the rim and into which the shank of one of the tooth holders is slideably mountable.

20 Claims, 7 Drawing Sheets

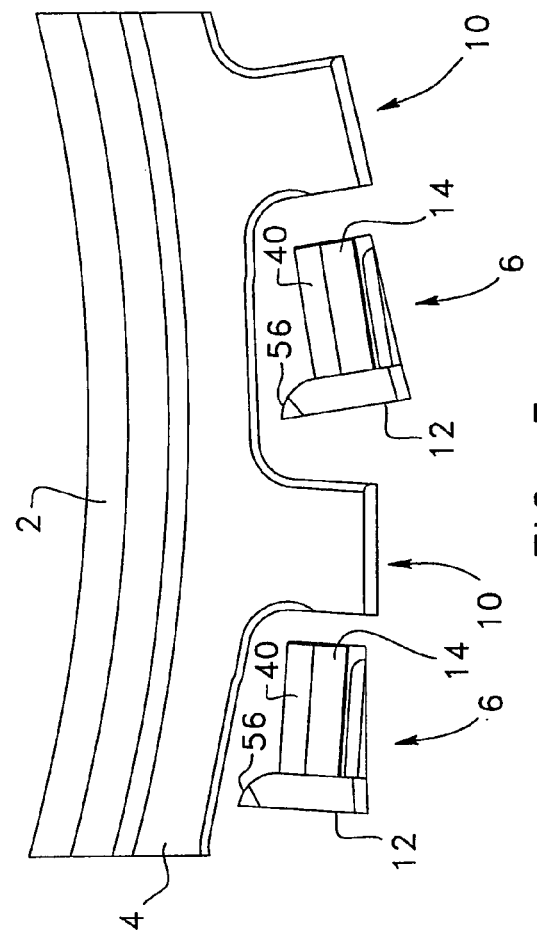
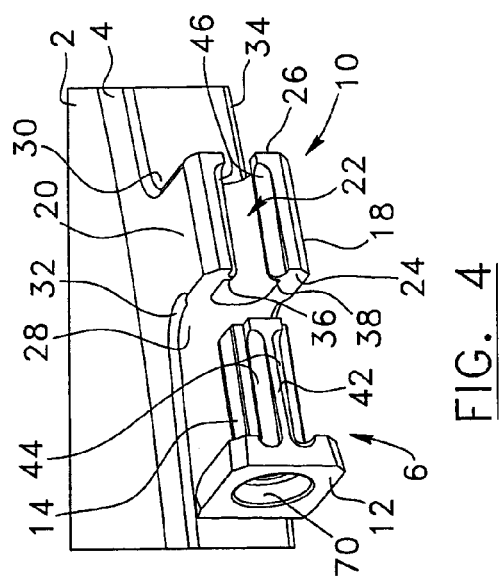
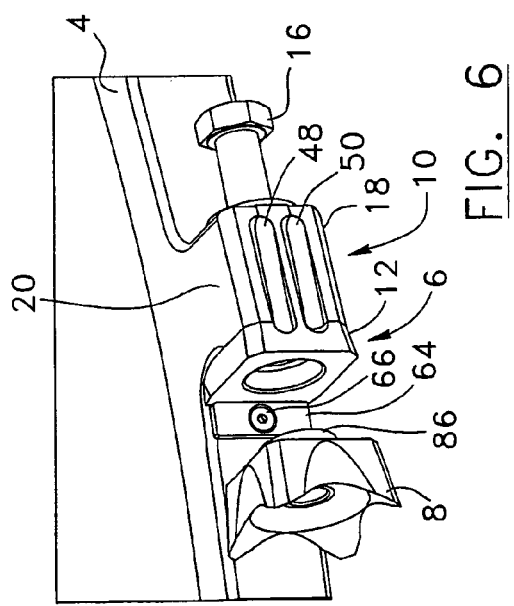

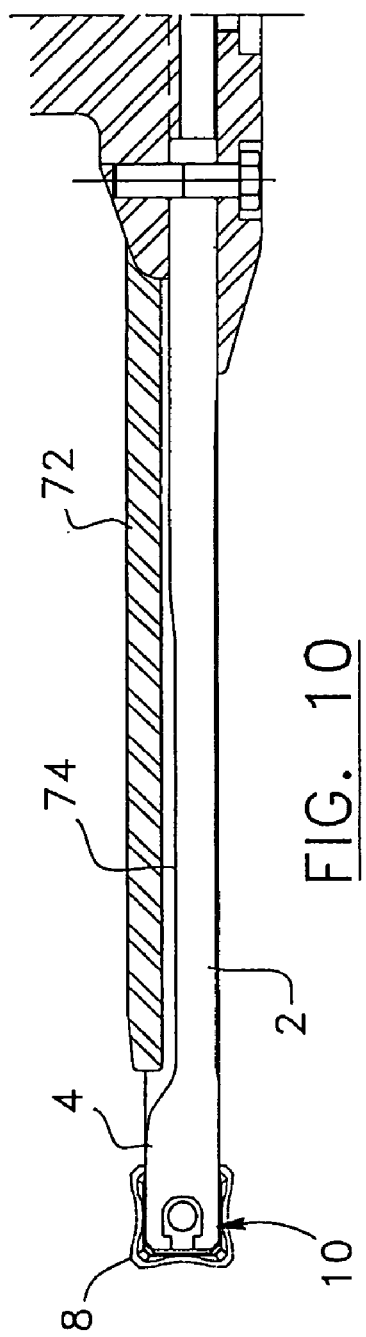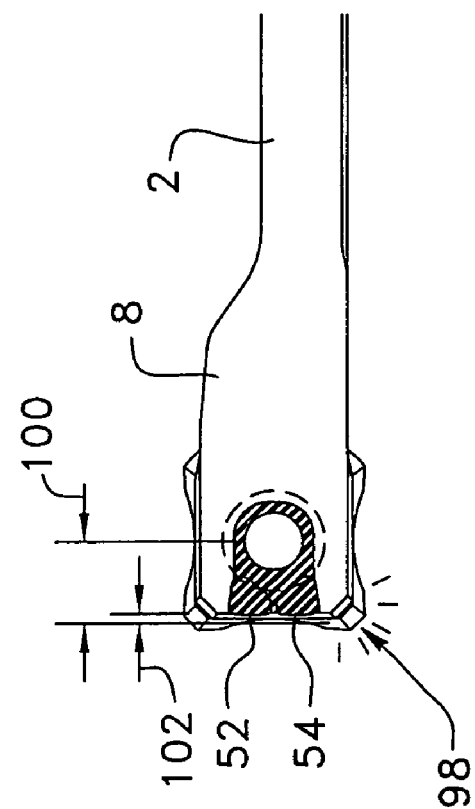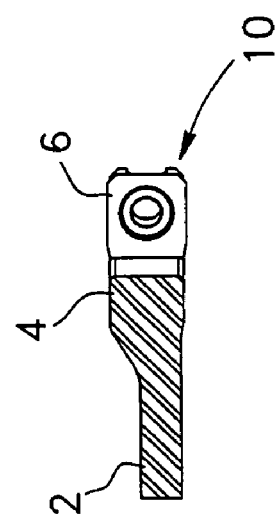

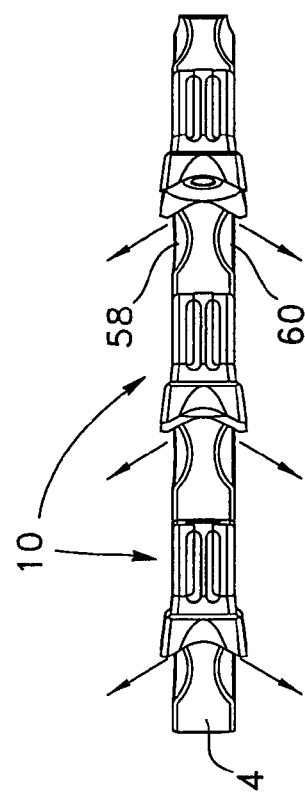
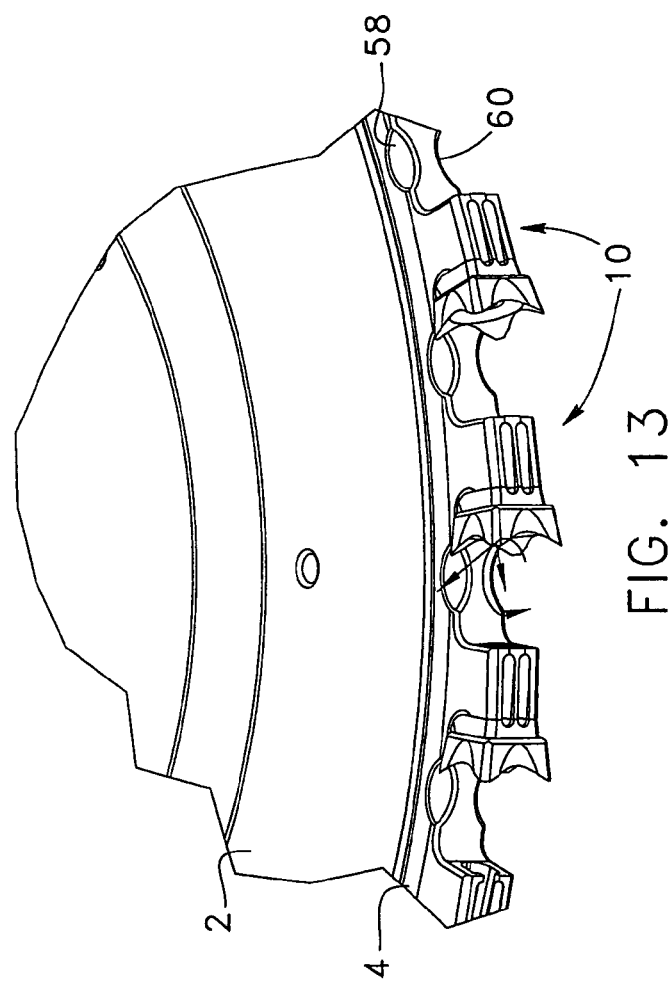
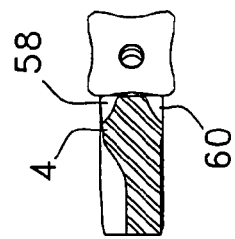

CIRCULAR SAW BLADE ASSEMBLY FOR A TREE FELLING HEAD

FIELD OF THE INVENTION

The present invention relates to a circular saw blade for a tree felling head.

BACKGROUND

Known in the art is U.S. Pat. No. 5,377,731 (Wildey) which shows a saw blade of a type which is used in a tree felling head. The saw blade has a disc provided with tooth holders about its periphery which support cutting teeth asymmetrically above an inner plate of the disc. As shown in FIG. 1, the tooth holders are in the form of protrusions radially projecting from the rim of the disc. Each tooth holder has a transverse central mounting bore. The mounting bore has a larger diameter on one side to receive the shank of a tooth, and a smaller diameter on the other side to receive the shank of a bolt screwed in the shank of the tooth to hold it in place on the tooth holder. One problem with this tooth retaining system is that the tooth holders must be sufficiently spaced from one another to leave enough space for passage of the bit used to drill the mounting bores, thereby limiting the number of possible teeth and tooth holders around the saw blade (e.g. to 18 teeth) and forcing them to be undesirably remote from one another, which reduce the cutting efficiency of the saw blade. Also, the impact on the outer edge of the teeth produces a shearing force on the tooth retaining system, i.e. the shanks of the teeth and the bolts, causing premature wear due to the configuration of the teeth and of the tooth holders. The tooth holders may be separate from the disc, in which case they form a part of the rim of the disc and are fastened to it using bolts extending across superimposed portions of the tooth holders and the disc. Such a mounting arrangement is expensive and presents certain risks for the blade such as holders becoming loose and cracks at the periphery of the blade originating from the mounting holes, in addition to safety risks.

SUMMARY

An object of the invention is to provide a circular saw blade assembly for a tree felling head, capable of having more teeth per blade for a more efficient cut.

Another object of the invention is to provide such a circular saw blade assembly having interchangeable hardened tooth holders.

Another object of the invention is to provide such a circular saw blade assembly with an increased safety of the teeth and tooth holders.

Another object of the invention is to provide such a circular saw blade assembly with a better clearance of the butt plate for good penetration.

Another object of the invention is to provide such a circular saw blade assembly with teeth having low coefficients of friction.

Another object of the invention is to provide such a circular saw blade assembly capable of receiving teeth which can be of two possible sizes.

Another object of the invention is to provide such a circular saw blade assembly having tooth holder arrangements easier to maintain.

Another object of the invention is to provide such a circular saw blade assembly having a universal core adapting to various models of tree felling head.

According to the present invention, there is provided a disc for a circular saw blade of a tree felling head of a type which has cutting teeth peripherally mounted around the disc through tooth holders having respective shanks, comprising:

a circular disc plate;

a rim around the disc plate; and mounting lug arrangements evenly distributed and outwardly projecting around the rim, each mounting lug arrangement having opposite lug elements spaced from each other and extending substantially in parallel with a radial plane of the disc plate, the lug elements of each mounting lug arrangement defining an outwardly opened channel extending substantially in a tangential direction with respect to the rim and into which the shank of one of the tooth holders is slideably mountable.

According to the present invention, there is also provided a circular saw blade assembly of a tree felling head of a type which has peripherally mounted cutting teeth, comprising:

a circular disc plate;

a rim around the disc plate;

tooth holders having respective heads adapted to receive the cutting teeth, and respective shanks projecting behind the heads and adapted to receive bolts for fastening the cutting teeth against the heads of the tooth holders; and mounting lug arrangements evenly distributed and outwardly projecting around the rim, each mounting lug arrangement having opposite lug elements spaced from each other and extending substantially in parallel with a radial plane of the disc plate, the lug elements of each mounting lug arrangement defining an outwardly opened channel extending substantially in a tangential direction with respect to the rim and into which the shank of one of the tooth holders is slideably mountable.

BRIEF DESCRIPTION OF THE DRAWINGS

A detailed description of preferred embodiments will be given herein below with reference to the following drawings, in which like numbers refer to like elements:

FIG. 4 is a schematic partial perspective view illustrating a mounting lug arrangement prior to installation of a tooth holder according to the present invention.

FIG. 5 is a schematic partial top view illustrating mounting lug arrangements prior to installation of respective tooth holders according to the present invention.

FIG. 6 is a schematic partial perspective view illustrating installation of a tooth holder in a mounting lug arrangement according to the present invention.

FIG. 10 is a schematic partial cross-section view illustrating a tree felling head with a circular saw blade assembly according to the present invention.

FIG. 11 is a schematic partial cross-section view illustrating a rim of a circular saw blade assembly according to the present invention.

FIG. 12 is a schematic partial rear view illustrating a rim with a mounting lug arrangement according to the present invention.

FIGS. 13, 14 and 15 are schematic partial perspective, side and cross-section views illustrating a rim with gullet cuts according to the present invention.

DETAILED DESCRIPTION OF THE PREFERRED EMBODIMENTS

Figure 1:
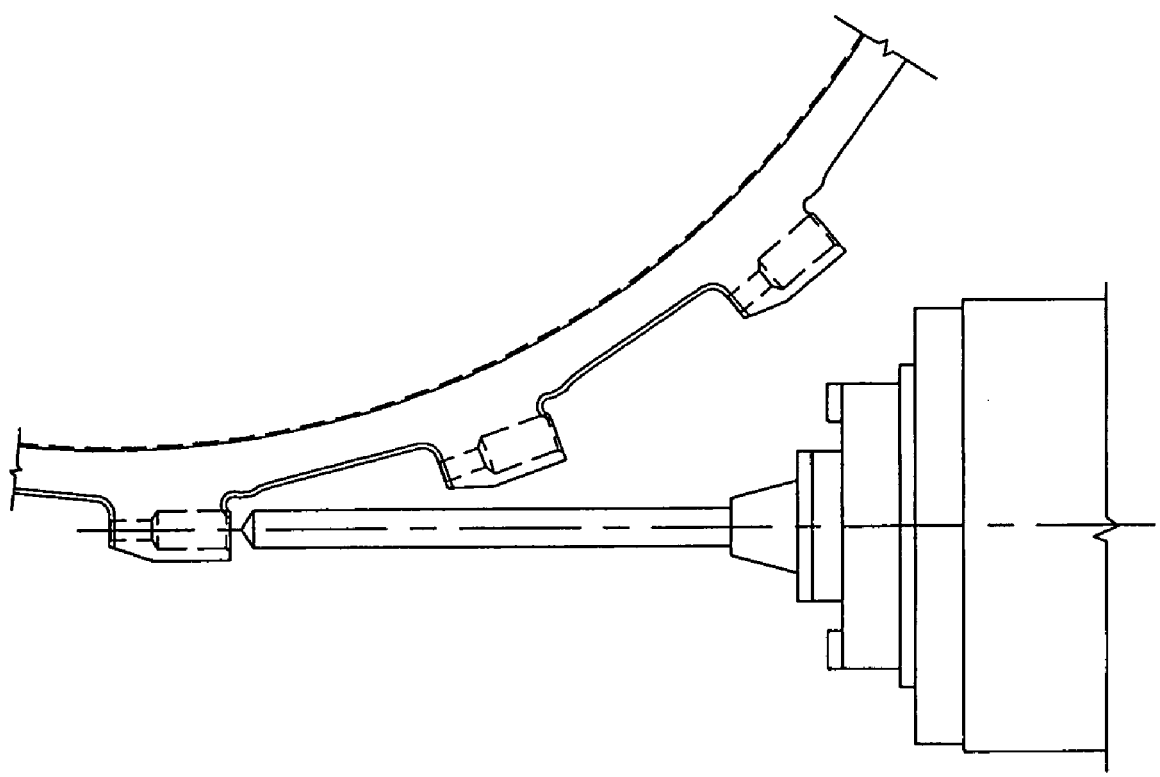
FIG. 1 is a schematic partial side view illustrating a drilling operation to form tooth mounting bores on a conventional blade disc.
Figure 2:
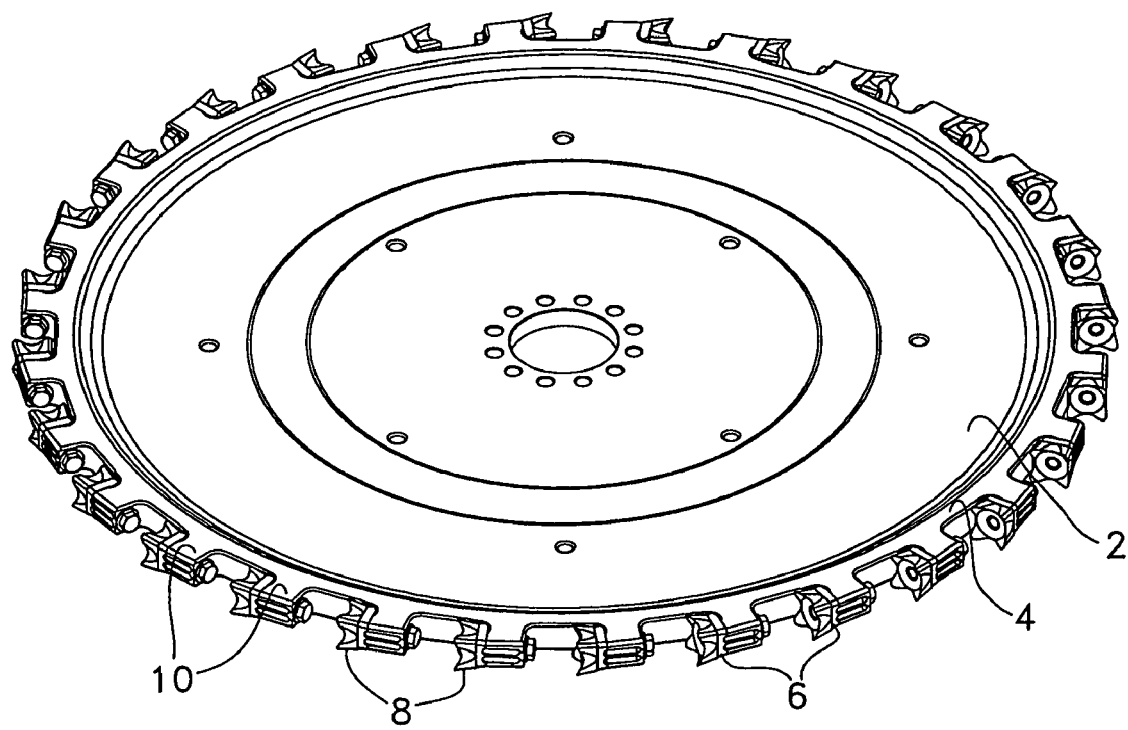
FIG. 2 is a schematic perspective view illustrating a circular saw blade assembly according to the present invention.

Referring to FIG. 2, there is shown a circular saw blade assembly according to the present invention. The saw blade assembly is particularly intended for use in a tree felling head of a type which has peripherally mounted cutting teeth. The saw blade assembly has a circular disc plate 2, a rim 4 around the disc plate 2, tooth holders 6, cutting teeth 8, and mounting lug arrangements 10.

Referring to FIGS. 4–6, the tooth holders 6 have respective heads 12 adapted to receive the cutting teeth 8 (as shown in FIG. 6), and respective shanks 14 projecting behind the heads 12 and adapted to receive bolts 16 (as shown in FIG. 6) for fastening the cutting teeth 8 against the heads 12 of the tooth holders 6.

The mounting lug arrangements 10 are evenly distributed and outwardly project around the rim 4. Each mounting lug arrangement 10 has opposite lug elements 18, 20 (as best shown in FIG. 4) spaced from each other and extending substantially in parallel with a radial plane of the disc plate 2. The lug elements 18, 20 of each mounting lug arrangement 10 define an outwardly opened channel 22 extending substantially in a tangential direction with respect to the rim 4 and into which the shank 14 of one of the tooth holders 6 is slideably mountable. The tooth holders 6 are thus interchangeable.

Referring to FIG. 4, each mounting lug arrangement 10 has opposite leading and trailing end surfaces 24, 26 generally radially projecting from the rim 4. The leading and trailing end surfaces 24, 26 may advantageously have oppositely curved base portions 28, 30 joining the rim 4, to provide a better stress absorption and distribution.

The end surfaces 24, 26 and the rim 4 may advantageously have congruous bevelled edges 32, 34 extending on opposite sides of the circular disc plate 2.

The rim 4 may, on one of its both sides, exhibit an angle to reduce the eventual contact and friction with the tree trunk.

Preferably, the bevelled edges 32, 34 of the leading end surface 24 of each mounting lug arrangement 10 extend only along the curved base portion 28 of the leading end surface 24 to provide steady seating for the tooth holder 6.

Each mounting lug arrangement 10 has a C-shaped profile with facing bracing flanges 36, 38.

Referring also to FIG. 5, the shank 14 of each tooth holder 6 has a rounded side 40 generally matching a bottom surface of the channel 22, and an opposite side provided with a projecting tongue 42 arranged to generally fit between the bracing flanges 36, 38 of any one of the mounting lug arrangements 10.

Figure 8:
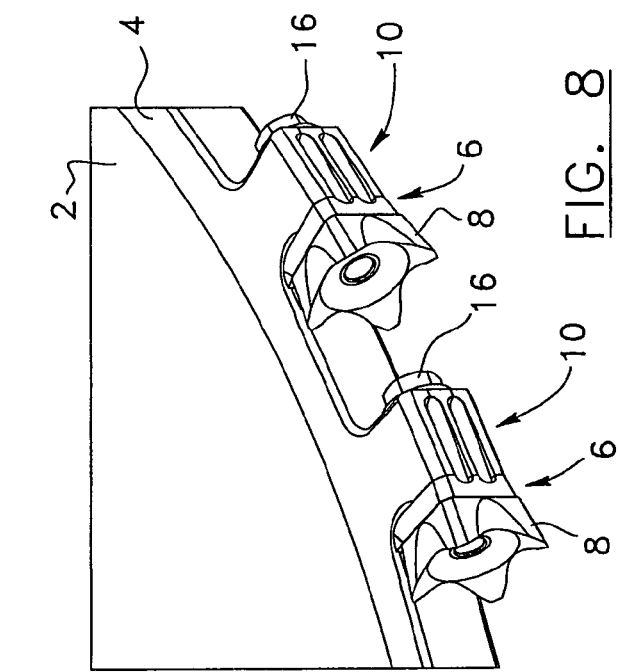
FIGS. 7 and 8 are schematic partial top and perspective views illustrating tooth holders installed in mounting lug arrangements according to the present invention.

Referring to FIGS. 4, 6, 8 and 12, the bracing flanges 36, 38 and the tongue 42 may advantageously have complementary bevelled longitudinal outer edges 44, 46 defining parallel obround slots 48, 50 (as best shown in FIGS. 6 and 8) adapted to receive solder material 52, 54 (as shown in FIG. 12) for attaching the tooth holders 6 to the mounting lug arrangements 10. The tooth holders 6 are thereby interchangeable to allow their replacement once they are damaged. Removal of the solder material 52, 54 can be achieved for example by grinding. Glue (as used in the automobile industry) or any other suitable fastening arrangements can be used if desired instead of solder material, and the obround slots 48, 50 can be eliminated if they are no longer used. Even a simple tightening arrangement using the bolts 16 can be implemented for this purpose, if desired.

The mounting lug arrangements 10 and the circular disc plate 2 may advantageously be formed as a single piece. The blade assembly can thus be fully obtained by properly machining a crude disc so as to form the peripheral projections providing the mounting lug arrangements, to form the rim 4, and to shape the upper and lower surfaces of the disc 2 as desired.

The tooth holders 6 may advantageously have respective tooth shank seating bores 71 defined in the heads 12 only, thereby eliminating the need of drilling holes in the mounting lug arrangements 10 for receiving the shanks of conventional teeth. Instead, the teeth 8 are mounted on the tooth holders 6 which are slideably mounted in the channels 22 of the mounting lug arrangements 10. The channels 22, specially profiled as described hereinafter, are machined at the blade's periphery and not along an axis more or less perpendicular to a radial axis or the disc 2 as it is normally the case with former machined blades.

Figure 7:
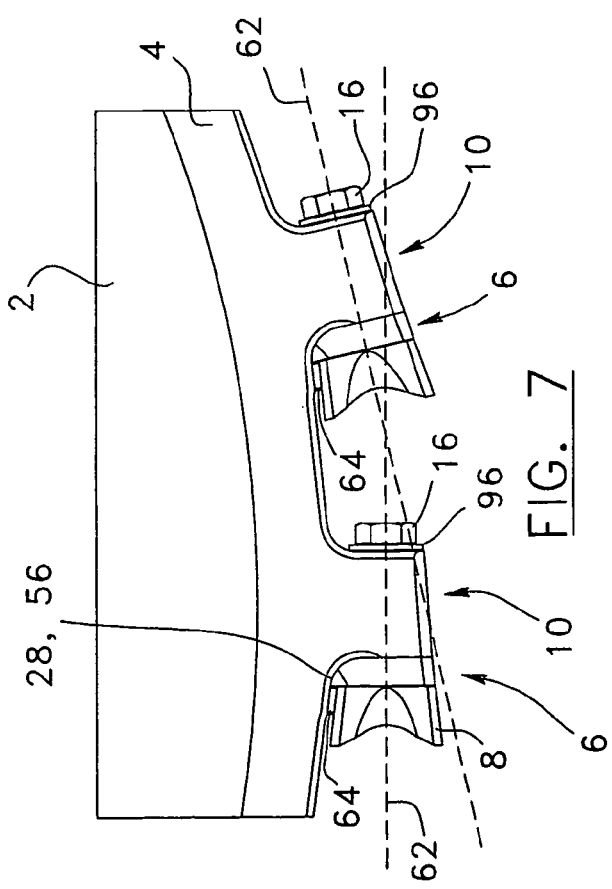

Referring to FIGS. 5 and 7, the heads 12 of the tooth holders 6 may advantageously have a curved side 56 (as best shown in FIG. 5) generally matching the curved base portions 28 of the front end surfaces 24, thereby preventing the tooth holders 6 to rotate and providing steady contact between the parts.

Figure 9C:
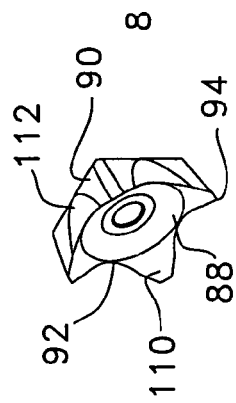
FIGS. 9A–C are schematic front, side and perspective views illustrating a tooth according to the present invention.
Figure 9B:
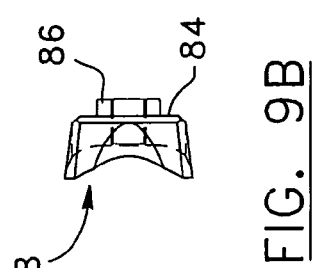
Figure 9A:
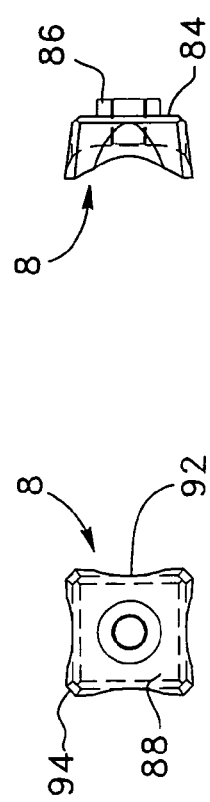

Referring to FIGS. 9A–C, the cutting teeth 8 may advantageously have a squared back 84 and a relatively short shank 86 (as shown in FIG. 9B) projecting behind the back 84, to protect the bolts 16 from shearing forces. The short shank 86 also increases the bolting surface of the tooth 8 while using a very short bolt 16 allowing teeth 8 closer to one another. The teeth 8 have a concave front face advantageously forming an inner conical shape 88 and four generally flat sides 90 with elliptic edges 92 reducing the coefficient of friction of the teeth 8 and increasing the protuberance of the cutting tips 94 defined by the projecting corners of the front face. The volume of material of each tip 94 is increased by each taper front shape 110. The sides 90 may advantageously be provided with lateral incurved recesses 112 extending between the cutting tips 94, reducing friction during the cut. The incurved recesses 112 also increase the protuberance of the "V" lateral profile in order to facilitate the penetration in the fiber. The incurved recesses 112 may have an elliptic profile opened on the front face of the square head and may advantageously extend from the front face to the back 84. The sides 90 may form a frustum shape tapering to the back 84.

Referring to FIGS. 10 and 11, the rim 4 may advantageously be thicker than the circular disc plate 2 for better rigidity, and project on at least one side of it. In the illustrated case, the rim 4 projects on the top side of the disc plate 2. As a result, the teeth 8 are off-centered with respect to the median plane of the disc 2 for clearance of the butt plate 72. The upper side of the disc 2 may advantageously have an outer recessed portion 74 so that there is a progressive distance between the butt plate 72 and the disc 2, e.g.

from 0.19 inch to 0.31 inch. This disc design helps maintaining the butt plate's clearance to avoid high pressure buildup in the butt plate 72 which may cause cracking and undesirable contacts with the rotating disc 2 which could largely reduce the cutting efficiency of the blade assembly.

Referring to FIG. 12, pressed fitted in their mounting lug arrangements 10, the tooth holders 6 are "linked" with them by welding or soldering. This welding increases the volume of the tooth holders' material where it is most desired, i.e. at the periphery of the blade. Considering the increased number of teeth 8 (approximately 36%), and the design features of the teeth holders 6, once welded, it is easy to conclude that the blade assembly according to the present invention is as safe as it could be. A comparative study gives an impact point 98 at 0.92 inches from the bolt's center, as depicted by arrows 100. This distance is given for a 2 inches wide tooth. Increasing this distance also increases the shearing force on the tooth retaining system, i.e. the shank 86 and the bolt 16 (see e.g. FIG. 6). The soldering material 52, 54, at approximately 0.11 inches from the impact point 98 as depicted by arrows 102, minimizes the effects of the shearing force on the tooth retaining system and increases the resistance of the assembly.

Referring to FIGS. 13–15, the rim 4 may advantageously have opposite notched outer edges forming gullets 58, 60 extending between each mounting lug arrangement 10, for better chip circulation or clearance.

Referring back to FIG. 7, the mounting lug arrangements 10 are spaced from one another such that a central axis 62 of each channel 22 crosses a next one of the mounting lug arrangements 10.

Referring to FIGS. 6 and 7, the same blade assembly may be used for different tooth sizes, e.g. 2 and 2.25 inches wide teeth (5 to 5.7 cm). Larger size teeth 8 can be directly assembled on the blade which, by side contacts, prevents their rotation. Spacers or shims 64 insertable between the rim 4 and the teeth 8 should preferably be provided when using smaller teeth 8. The shims 64 can be in the form of small plates attached to the rim 4 using bolts 66 or any other suitable fastener. It is thus possible to adapt the teeth size of the blade assembly to each condition depending on the size of the trees to be felled, of the butt plate, etc. Normally, for large diameter trees where the clearance of the blade (elimination of the friction) is more important than the volume of fiber to be removed, larger teeth size (e.g. 2.25 inches wide) provides a better efficiency. For smaller diameter trees where the friction is much lower, the use of smaller teeth (e.g. 2 inches wide) is much more appropriate.

Figure 3:
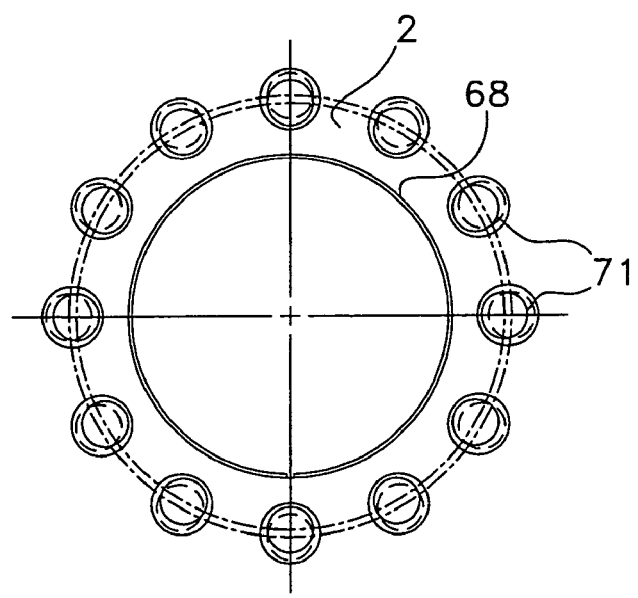
FIG. 3 is a schematic top view illustrating a universal core of a circular saw blade disc according to the present invention.

Referring to FIG. 3, the disc plate 2 may advantageously have a universal core having a replaceable central hub 68 and eccentric attachment bushings 70 distributed around the central hub 68. The blade assembly can be thereby adjusted easily to many models of felling heads by selecting the proper sized central hub 68 and by turning the eccentric attachment bushings 71 correctly to obtain the desired bolt pattern for the felling head.

Figure 16A:
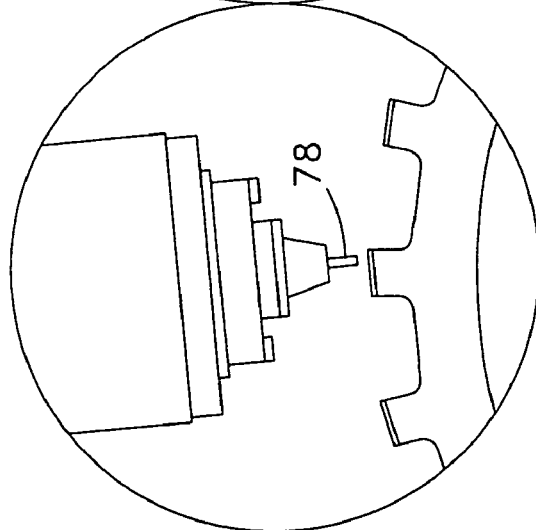
FIGS. 16A–B to 18A–B are schematic views illustrating operations to form channels in the mounting lug arrangements according to the present invention.
Figure 16B:
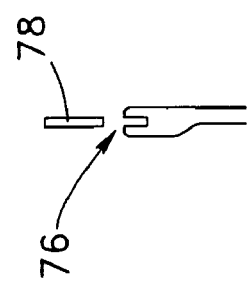
Figure 17A:
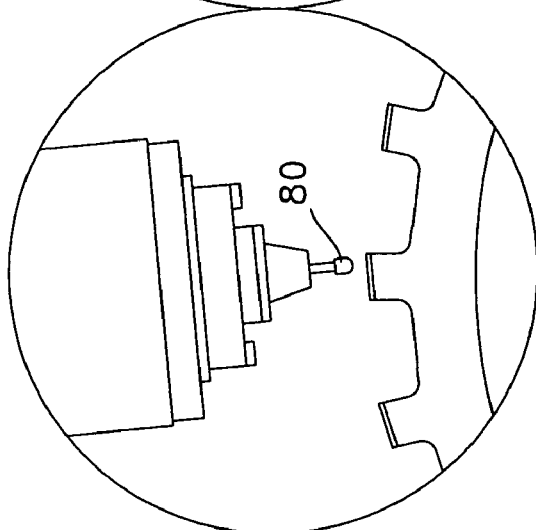
Figure 17B:
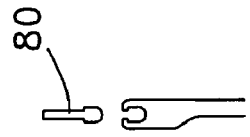
Figure 18A:
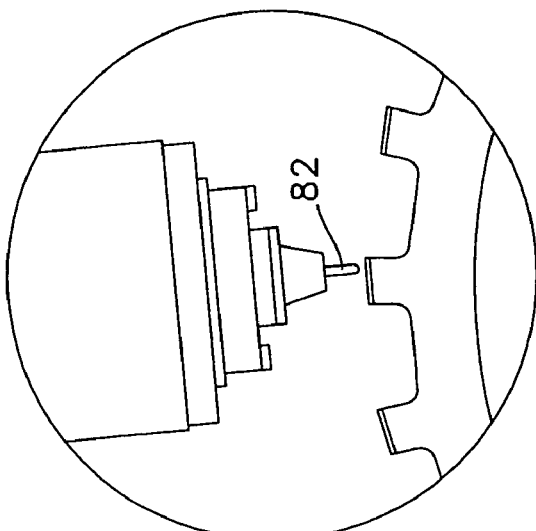
Figure 18B:
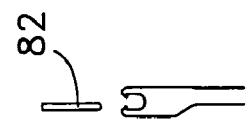

Referring to FIGS. 16A–B to 17A–B, the channels 22 can be formed as follows. First, a generally rectangular slot 76 is made in each of the outwardly projecting portions of the rim 4 intended to form a mounting lug arrangement e.g. with a milling tool 78, as shown in FIGS. 16A–B. Then, the facing inner side surfaces of the slot 76 are machined e.g. with a ball nose mill 80 so as to produce the C-shaped profile of the channel 22, as shown in FIGS. 17A–B. Finally, the inner upper portions of the facing flanges 36, 38 are machined e.g. with a finishing milling tool 82 to form parts 46 of the obround slots 48, 50 adapted to receive the welding material, as shown in FIGS. 18A–B. As all the machining operations can be made from radial directions with respect to the disc 2, the mounting lug arrangements 10 can be much closer from one another than before, thereby allowing an increased number of teeth on the saw blade assembly for a better cutting quality compared to former blades. As an example, for a blade diameter formerly limited to 18 teeth, as much as 28 teeth can now be provided with the saw blade assembly according to the present invention. For blade diameters ranging from 50 to 60 inches, the percentage of possible additional teeth may be between 33 to 40%. The higher number of teeth 8 reduces the stress on each tooth 8 by approximately 36%.

Referring to FIG. 2, machined with full holder mounting lug arrangements 10, the blade disc 2 almost completely absorbs the operating stress projected by the teeth 8. The design of the mounting lug arrangements 10 allows an axial press fit assembly with the tooth holders 6. In fact, when the components are assembled on the disc 2, i.e. the teeth 8, tooth holders 6, washers 96 (as shown in FIG. 7) and bolts 16, it would even be possible to operate the saw without welding the tooth holders 6 in place.

The saw blade assembly of the present invention demands less from the carrier's hydraulic system, provides a more efficient cut with less horsepower, requires a lower pressure (psi) to maintain the rpm of the saw, reduces windage losses, and allows very quick rpm recovery.

While embodiments of this invention have been illustrated in the accompanying drawings and described above, it will be evident to those skilled in the art that changes and modifications may be made therein without departing from the essence of this invention.

The invention claimed is:

1. A disc for a circular saw blade of a tree felling head of a type which has cutting teeth peripherally mounted around the disc through tooth holders having respective shanks, comprising: a circular disc plate; a rim around the disc plate; and mounting lug arrangements evenly distributed and outwardly projecting around the rim, each mounting lug arrangement being an integral part of the rim and having opposite lug elements spaced from each other and extending substantially in parallel with a radial plane of the disc plate, the lug elements of each mounting lug arrangement defining an outwardly opened channel having an opening on a side thereof opposite the rim, the opening extending substantially in a tangential direction with respect to the rim, the shank of one of the tooth holders being slideably mountable into the channel; wherein: each mounting lug arrangement has a C-shaped profile with facing bracing flanges; and the shank of each tooth holder has a rounded side substantially matching a bottom surface of the channel, and an opposite side provided with a projecting tongue arranged to substantially fit between the bracing flanges of any one of the mounting lug arrangements.

2. The disc according to claim 1, wherein each mounting lug arrangement has opposite leading and trailing end surfaces substantially radially projecting from the rim, the leading and trailing end surfaces having oppositely curved base portions joining the rim.

3. The disc according to claim 2, wherein the end surfaces of each mounting lug arrangement and the rim have congruous bevelled edges extending on opposite sides of the circular disc plate.

4. The disc according to claim 3, wherein the bevelled edges of the leading end surface of each mounting lug arrangement extend only along the curved base portion of the leading end surface.

5. The disc according to claim 1, wherein each mounting lug arrangement has a C-shaped profile with facing bracing flanges.

6. The disc according to claim 5, wherein the bracing flanges have bevelled longitudinal outer edges.

7. The disc according to claim 1, wherein the mounting lug arrangements and the circular disc plate are formed as a single piece.

8. The disc according to claim 1, wherein the rim is thicker than the circular disc plate and projects on at least one side thereof.

9. The disc according to claim 1, wherein the rim has opposite notched outer edges extending between each mounting lug arrangement.

10. The disc according to claim 1, wherein the mounting lug arrangements are spaced from one another such that a central axis of each channel crosses a next one of the mounting lug arrangements.

11. The disc according to claim 1, wherein the disc plate comprises a universal core having a replaceable central hub and eccentric attachment bushings distributed around the central hub.

12. A circular saw blade assembly of a tree felling head of a type which has peripherally mounted cutting teeth, comprising: a circular disc plate; a rim around the disc plate; tooth holders having respective heads adapted to receive the cutting teeth, and respective shanks projecting behind the heads and adapted to receive bolts for fastening the cutting teeth against the heads of the tooth holders; and mounting lug arrangements evenly distributed and outwardly projecting around the rim, each mounting lug arrangement being an integral part of the rim and having opposite lug elements spaced from each other and extending substantially in parallel with a radial plane of the disc plate, the lug elements of each mounting lug arrangement defining an outwardly opened channel having an opening on a side thereof opposite the rim, the opening extending substantially in a tangential direction with respect to the rim, the shank of one of the tooth holders being slideably mountable into the channel; wherein: each mounting lug arrangement has a C-shaped profile with facing bracing flanges; and the shank of each tooth holder has a rounded side substantially matching a bottom surface of the channel, and an opposite side provided with a projecting tongue arranged to substantially fit between the bracing flanges of any one of the mounting lug arrangements.

13. The circular saw blade assembly according to claim 12, wherein each mounting lug arrangement has opposite leading and trailing end surfaces substantially radially projecting from the rim, the leading and trailing end surfaces having oppositely curved base portions joining the rim.

14. The circular saw blade assembly according to claim 13, wherein the end surfaces of each mounting lug arrangement and the rim have congruous bevelled edges extending on opposite sides of the circular disc plate.

15. The circular saw blade assembly according to claim 14, wherein the bevelled edges of the leading end surface of each mounting lug arrangement extend only along the curved base portion of the leading end surface.

16. The circular saw blade assembly according to claim 13, wherein the heads of the tooth holders have a curved side substantially matching the curved base portions of the front end surfaces.

17. The circular saw blade assembly according to claim 12, wherein the bracing flanges and the tongue have complementary bevelled longitudinal outer edges defining parallel obround slots adapted to receive solder material.

18. The circular saw blade assembly according to claim 12, wherein the mounting lug arrangements and the circular disc plate are formed as a single piece.

19. The circular saw blade assembly according to claim 12, wherein the rim is thicker than the circular disc plate and projects on at least one side thereof.

20. The circular saw blade assembly according to claim 12, wherein the rim has opposite notched outer edges forming gullets extending between each mounting lug arrangement.

* * * * *